Sept. 25, 1962
A. W. HEINECK
3,056,108
ERROR CHECK CIRCUIT
Filed June 30, 1959
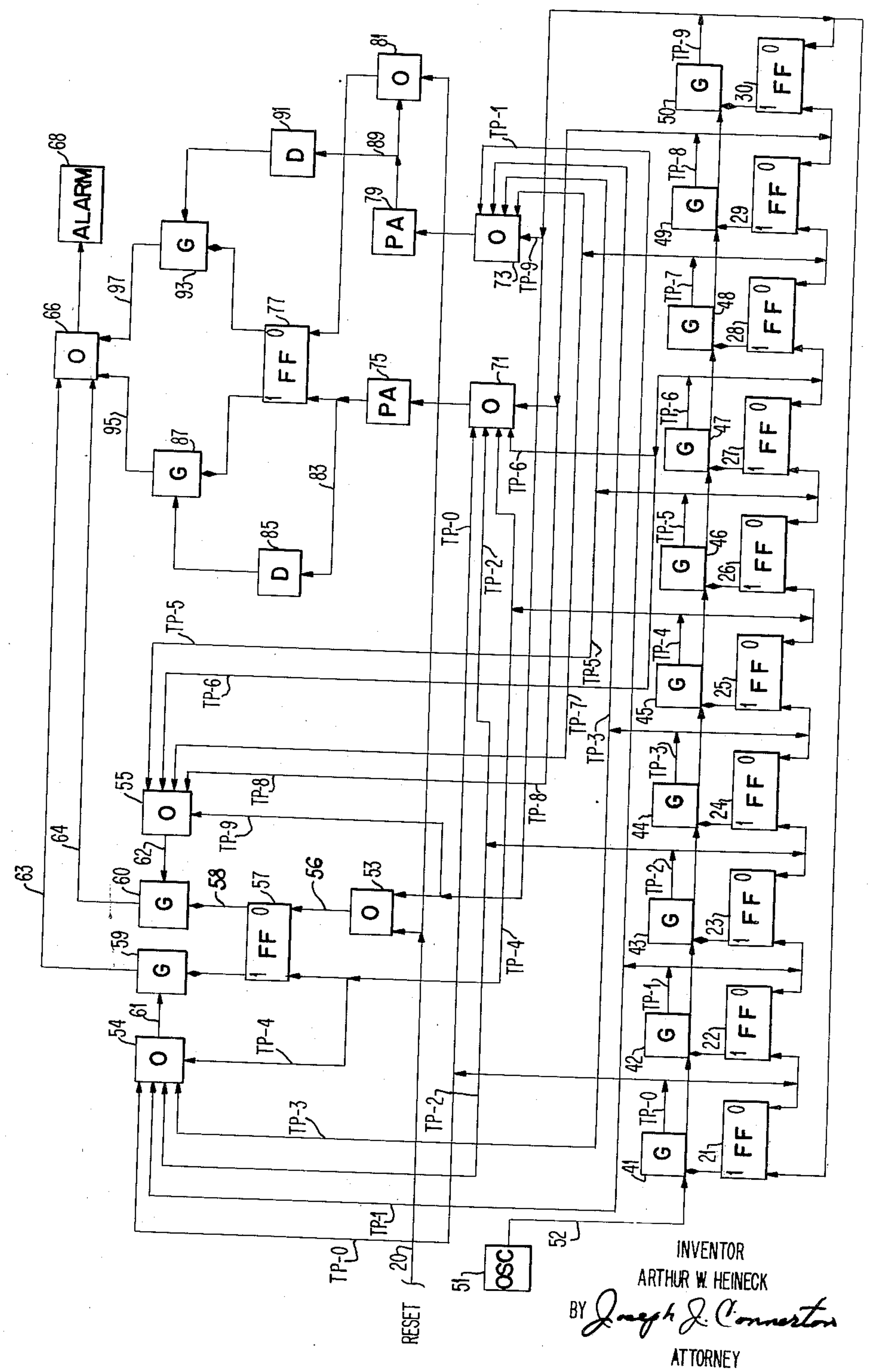
INVENTOR
ARTHUR W. HEINECK
BY Joseph J. Connerton
ATTORNEY 3,056,108
Patented Sept. 25, 1962

3,056,108

ERROR CHECK CIRCUIT

Arthur W. Heineck, Red Hook, N.Y., assignor to International Business Machines Corporation, New York, N.Y., a corporation of New York Filed June 30, 1959, Ser. No. 823,938
3 Claims. (Cl. 340—146.1)

This invention relates to an error checking circuit and more particularly to a time pulse distributor error checking circuit.

In electrical computing devices as well as in various other electrical machines, time pulse distributors are employed where it is desired to translate pulses from a single source to each one of a plurality of output conductors sequentially. Devices for this purpose may include a group of stages with each stage having a unilateral conducting apparatus which may be sequentially rendered conductive. The stages may be connected in a ring circuit to operate continuously in response to input pulses and thereby pulse each output conductor successively as the ring is operated through a complete cycle. One particular arrangement employed for this purpose utilizes a group of bi-stable devices, one device for each stage, and two unilateral conductive devices associated with each of said bi-stable devices, this arrangement being in the form of a closed ring. In operation, clock pulses are applied to all stages simultaneously to generate a time pulse from one stage and condition the subsequent stage to pass the next clock pulse and in this way time pulses are automatically sequenced from the time pulse distributor. In the arrangement herein described to illustrate the subject invention, a relatively simple means of generating time pulses in a desired sequence utilizing a minimum of equipment is described.

In a digital computer, the pulses generated by a timing pulse generator may be employed to operate command generators to execute a group of commands which make up a particular instruction being performed by the computer. Such instructions require that each time pulse be generated in proper sequence for each input pulse, and that only a single pulse be generated. Missing or extra pulses generated by the time pulse generator will prevent the commands making up the desired instruction from being performed. In the particular timing pulse generator herein described, extra time pulses could originate, for example, from failure of one of the flip-flops to clear. It is also possible that extra pulses could be introduced into the time pulse distributor by high intensity noise signals. A missing pulse could occur due to failure of either a flip-flop or a gate circuit in the timing pulse distributor or could also result from an unexpected stoppage of the timing pulse distributor (herein after designated TPD).

The present invention is directed toward error detecting apparatus for detecting missing or extra time pulses from a TPD. More specifically, in one arrangement according to this invention for detecting missing pulses, a flip-flop is alternately set and reset to its opposite stable states with alternating odd and even timing pulses. At the same time these pulses are delayed by an amount slightly greater than the time between consecutive time pulses. The one and zero outputs from the flip-flop condition associated gate circuits which are sampled or strobed by the delayed pulses. Under ordinary circumstances, the gates will be deconditioned when sampled by the delayed pulses. However, if a timing pulse is missing, the gate circuit will remain conditioned, and when sampled by the delayed pulse will provide an error signal to actuate an alarm. In the arrangement for detecting extra pulses, a flip-flop alternately deconditions a gate being strobed by TP–0 through TP–4, and then a gate being strobed by TP–5 through TP–9. If an extra pulse is generated, an extra pulse will be indicated within several time pulses by getting through one of the above gates, resulting in an error signal to actuate the alarm device.

Accordingly, a primary object of the present invention is to provide an improved error check circuit associated with a TPD.

Another object of the present invention is to provide a missing pulse detector circuit associated with a TPD.

A further object of the present invention is to provide an extra pulse detector circuit associated with a TPD.

Another object of the present invention is to provide a novel combination of a timing pulse distributor and associated error check circuitry adaptable for detecting extra or missing pulses from the time pulse distributor.

Still another object of the present invention is to provide a novel, simple and relatively inexpensive error check circuit for detecting erratic operations of a TPD.

Other objects of the invention will be pointed out in the following description and claims and illustrated in the accompanying drawing, which discloses, by way of example, the principle of the invention and in the best mode, which has been contemplated, of applying that principle.

With reference to the drawing, the TPD utilized in the preferred embodiment of the present invention comprises flip-flops 21 to 30 and associated gate circuits 41 through 50. As shown, gate circuits 41 through 50 are conditioned by the "1" output of associated flip-flops 21 through 30. In response to a train of cyclic input pulses generated by master oscillator 51 and applied through conductor 52 to sample gate circuits 41 through 50, the particular gate circuit which is conditioned by its associated flip-flop generates an output signal which sets the succeeding flip-flop to the one state and resets the original flip-flop to the zero state. To illustrate the operation of the TPD, it is assumed that prior to operation, flip-flop 21 will be set to the "1" state, thereby conditioning gate circuit 41, and flip-flops 22–30 will be reset to the "0" state by any conventional means such as energizing the appropriate input lines. In response to the first clock pulse from master oscillator 51, an output signal labeled TP–0 is generated from gate circuit 41 and applied to set flip-flop 22 in the "1" state thereby conditioning gate circuit 42 and resetting flip-flop 21 to the "0" state. On the succeeding clock pulse from oscillator 51, an output pulse labeled TP–1 is generated by gate circuit 42 which sets flip-flop 23 in the "1" state, thereby conditioning gate circuit 43, and resets flip-flop 22 to the "0" state. In like manner each clock pulse from oscillator 51 generates a pulse through the conditioned gate circuit, which resets the associated flip-flop and causes the next gate circuit to be conditioned. Thus, effectively the TPD constitutes a stepping register in which an output pulse is stepped sequentially from stage to stage in response to a train of input signals. The output signals generated by gates 41 to 50 are labeled TP–0 through TP–9 respectively. It is readily seen from the foregoing description that each clock pulse from oscillator 51 causes one and only one timing pulse to be generated by the timing pulse generator. Thus the first clock pulse generates the timing pulse labeled TP–0, the second clock pulse TP–1, the third clock pulse TP–2 and so forth until the tenth clock pulse provided by oscillator 51 generates TP–9. When the TP–9 pulse is generated from gate circuit 50, it resets flip-flop 30 to the "0" state and conditions gate circuit 41 through flip-flop 21, and the next timing cycle begins so that the TPD functions as a closed ring.

The operation described above with respect to the TPD is essential to the operation of a digital computer, since each computer instruction requires a unique series of commands to be executed in a particular sequence under the control of the TPD. Thus a single missing pulse or an extra pulse generated during a particular instruction will result in the wrong sequence of commands for such instruction being generated. In the event that a timing pulse is not generated or an extra pulse generated, the instruction will not be performed correctly and it is desirable to detect this situation as soon as it occurs, since any computed results after this time will probably be in error.

The logic employed for extra pulse detection comprises logical OR circuits 53 to 55 inclusive, flip-flop 57 and gate circuits 59 and 60 which operate with the TPD in the following manner. In response to a reset signal on line 20, flip-flop 57 is set in the zero state via OR circuit 53 and conductor 56, thereby conditioning gate circuit 60 through conductor 58. Since gate circuits 59 and 60 are connected to opposite outputs from the flip-flop 57, gate circuit 59 is deconditioned at this time. The first five timing pulses generated by the TPD labeled TP–0 through TP–4 are applied successively through OR circuit 54 to sample gate circuit 59 via conductor 61. Since gate circuit 59 is not conditioned, no outputs will be provided.

At TP–4 time, the TP–4 signal is simultaneously applied through OR circuit 54 to gate circuit 59, and at the same time is applied directly to the "1" input of flip-flop 57, thereby reversing the state of flip-flop 57 and conditioning gate circuit 59. However, due to the transition time required to reverse the state of flip-flop 57 relative to the duration of the input pulse, gate circuit 59 is sampled by the TP–4 pulse prior to the transition of flip-flop 57 to the one state. In like manner, the TPD signals TP–5 through TP–9 are applied sequentially through OR circuit 55 and conductor 62 to gate circuit 60. Since flip-flop 57 is in the "1" state, gate circuit 60 is not conditioned and no output will be provided therefrom. At TP–9 time, the TP–9 signal is applied through OR circuit 55 to sample gate circuit 60, and simultaneously is applied to OR circuit 53 to reverse the state of flip-flop 57 to the zero state. In the same manner as described with reference to the TP–4 pulse, gate circuit 60 is sampled prior to the time of transition of flip-flop 57 to the "0" state. Thus it will be apparent that during the initial portion of the TPD operating cycle, namely TP–0 through TP–4, gate circuit 59 which is sampled by these pulses is not normally conditioned. Similarly, during the latter portion of the TPD cycle, namely TP–5 through TP–9, gate circuit 60 which is sampled by these pulses is not normally conditioned. However, if an extra pulse is generated during the normal timing cycle as would occur if one of flip-flops 21–30 stays in the "1" state, an extra pulse will be continuously generated and therefore will get through either gate circuit 59 or 60 and an output will be provided via conductors 63 or 64 through OR circuit 66 to actuate an alarm device 68, indicating an error.

Due to the manner of operation of the TPD herein described, should a signal be erroneously entered into the closed ring, the normal operation will be that both the error signal and the correct time pulse will be sequentially operated from stage to stage. Thus, for example, in the initial portion of the circuit should a TP–1 be generated at the same time as the TP–0 pulse, no error indication will be provided immediately. However, at TP–5 time gate circuits 59 and 60 will be sampled simultaneously and an error signal will be produced by the output from gate circuit 59, since flip-flop 57 will not have been set to the "0" state by the TP–5 pulse in time to block the error pulse on conductor 61 which two successive outputs on the TP–4 line will produce. In like manner, should an extra pulse be generated during the latter half of the TPD cycle, an error may not be indicated until TP–0 time, when gate circuits 59 and 60 will be sampled simultaneously to actuate alarm device 68.

From the above description, it will be apparent that the extra pulse will be detected, and in the worse condition may require a maximum of four timing pulses before detection. Referring now to the circuitry used to accomplish detection of missing pulses, it is seen that the even numbered timing pulses, TP–0, TP–2, TP–4, TP–6 and TP–8 are applied to OR circuit 71, while the odd numbered timing pulses, TP–1, TP–3, TP–5, TP–7, and TP–9 are applied through logical OR circuit 73. The output of OR circuit 71 is applied through pulse amplifier 75 to set flip-flop 77 in the "1" state, while the output from OR circuit 73 is applied through pulse amplifier 79 and logical OR circuit 81 to set flip-flop 77 in the "0" state. Thus, flip-flop 77 is alternately gated from one stable state to the other by alternate odd and even timing pulses. At the same time that the even timing pulses set flip-flop 77 to the one state, they are also applied through conductor 83 and delay unit 85 to sample gate circuit 87; the odd numbered timing pulses applied to set flip-flop 77 to the zero state are also applied via conductor 89 and delay unit 91 to sample gate circuit 93. The delay provided by delay circuits 85 and 91 is equal to the interval between timing pulses plus the transition time of a flip-flop, so that gate circuits 87 and 93 are no longer conditioned by the time they are sampled by the delayed even and odd timing pulses. Thus under ordinary conditions, gate circuits 87 and 93 will be deconditioned when the delayed time pulses strobe them and there will be no error signal output. However, if a time pulse is missing, the flip-flop will remain in the state dictated by the last time pulse received, and the delayed time pulse will strobe the associated gate circuit and generate an output signal on conductors 95 or 97 which will then be applied through OR circuit 66 to actuate the alarm device 68. Thus, the missing pulse detector portion of the subject invention due to the delay of each received pulse will automatically detect a missing pulse condition as soon as it occurs.

Thus, for a nominal amount of additional equipment, a substantially complete check can be made of the output from the time pulse distributor by means of the subject invention. Either extra pulses or the absence of pulses from the time pulse distributor will automatically actuate an alarm device thereby indicating that one of these conditions has occurred. By means of the subject invention, any failure experienced by the time pulse distributor will be detected before the particular instruction being performed is carried out, thereby preventing inaccurate and misleading information from being generated by the computer.

Various "basic" circuits have been shown in the drawing and described operationally in the specification. While such circuits could comprise any circuit having the above described characteristics, flip-flops, gate circuits and logical OR circuits are preferably those shown and described in copending application Serial No. 824,105, entitled "Asynchronous Multiplier," filed by Charles J. Tilton on June 30, 1959. The pulse amplifiers 75 and 79 may for example comprise a circuit such as shown in the lower portion of FIGURE 8, of the above referenced copending application. Oscillator 51 may be any conventional oscillator. Similarly, delay units 85 and 91 may be any conventional apparatus for providing the desired delay.

While there has been shown and described certain preferred embodiments of the invention, it will be understood that the invention is not intended to be limited thereto or to details thereof and departures may be made therefrom within the spirit and scope of the invention as defined in the following claims.

What is claimed is:

1. A circuit for detecting a missing pulse in a train of repetitive pulses spaced by a substantially uniform time interval comprising, in combination:

a bistable device having output terminals, one of said output terminals being energized when the bistable device is in a first one of its stable states and the other output terminal being energized when the bistable device is in its other stable state;

means responsive to each pulse in said train of pulses for altering the stable state of said bistable device;

a gating means connected to each output terminal of said bistable device; and, means for sampling each of said gating means with the pulses from said pulse train which switch said bistable device to the stable state which energizes the output terminal connected to the related gating means, said sampling means including means for delaying said pulses for an interval slightly greater than said uniform time interval;

whereby an output from one of said gating means indicates a missing pulse.

2. A circuit for detecting extra pulses in a succession of pulses generated by a time pulse distributor comprising in combination:

a pulse train source;

a bistable device having output terminals, one of said output terminals being energized when the bistable device is in a first and its stable states and the other output terminal being energized when the bistable device is in its other stable state;

an individual gating means connected to each of said output terminals;

means for dividing said succession of pulses into two groups, a first group containing the succeeding pulses in a part of said succession of pulses and a second group containing the succeeding pulses in the remaining part of said succession of pulses;

means for sampling one of said gating means with the succeeding pulses of said first pulse group;

means for sampling the other of said gating means with the succeeding pulses of said second pulse group;

means responsive to the last pulse of said first group for driving said bistable device to the stable state which energizes the output terminal connected to said one gating means;

and means responsive to the last pulse in said second group for driving said bistable device to the stable state which energizes the ouput terminal connected to said other gating means.

3. A checking circuit for detecting extra or missing pulses in a succession of pulses spaced by a substantially uniform time interval from a time pulse distributor comprising in combination with a time pulse distributor:

a first circuit for indicating an extra pulse generated by said time pulse distributor, said first circuit including means for grouping said pulses into a first group containing the succeeding pulses in a part of said succession of pulses and a second group containing the succeeding pulses in the remaining part of said succession of pulses, first and second gating means, means for conditioning said first gating means for the normal duration of said second pulse group, means for conditioning said second gating means for the normal duration of said first pulse group, means for sampling said first gating means with the pulses of said first pulse group and means for sampling said second gating means with the pulses of said second pulse group;

a second circuit for indicating a missing pulse from said time pulse distributor, said second circuit including third and fourth gating means, means responsive to alternate pulses of said succession of pulses for conditioning said third gating means, means responsive to the other pulses in said succession of pulses for conditioning said fourth gating means, and means for sampling said third and fourth gating means with the pulses which are applied to condition them, said sampling means including means to delay said pulses by an interval slightly greater than said uniform time interval;

and means responsive to an output from said first, second, third, or fourth gating means for indicating an extra or missing pulse from said time pulse distributor.

References Cited in the file of this patent

UNITED STATES PATENTS 2,719,959 Hobbs ---------------- Oct. 4, 1955
2,904,781 Katz ---------------- Sept. 15, 1959